(12) United States Patent
Gunaydin et al.

(10) Patent No.: US 11,760,285 B2
(45) Date of Patent: Sep. 19, 2023

(54) AUTOMOBILE CRASH BOX SYSTEM

(71) Applicant: ISTANBUL TEKNIK UNIVERSITESI, Istanbul (TR)

(72) Inventors: Kadir Gunaydin, Nigde (TR); Halit Suleyman Turkmen, Istanbul (TR)

(73) Assignee: ISTANBUL TEKNIK UNIVERSITESI, Istanbul (TR)

( * ) Notice: Subject to any disclaimer, the term of this patent is extended or adjusted under 35 U.S.C. 154(b) by 229 days.

(21) Appl. No.: 17/283,974

(22) PCT Filed: Sep. 25, 2019

(86) PCT No.: PCT/TR2019/050790
§ 371 (c)(1),
(2) Date: Apr. 9, 2021

(87) PCT Pub. No.: WO2020/086032
PCT Pub. Date: Apr. 30, 2020

(65) Prior Publication Data
US 2021/0380056 A1 Dec. 9, 2021

(30) Foreign Application Priority Data

Oct. 24, 2018 (YE) .................................. 2018/15902

(51) Int. Cl.
*B60R 19/34* (2006.01)
*B60R 19/18* (2006.01)

(52) U.S. Cl.
CPC .............. *B60R 19/18* (2013.01); *B60R 19/34* (2013.01); *B60R 2019/1866* (2013.01)

(58) Field of Classification Search
CPC ............ B60R 19/34; B60R 2019/1866; B60R 2019/1893; B60R 19/023; B60R 19/26
(Continued)

(56) References Cited

U.S. PATENT DOCUMENTS

| 11,001,214 | B2 * | 5/2021 | Sovic | ..................... B60R 19/023 |
| 2008/0030031 | A1 * | 2/2008 | Nilsson | ................... B60R 19/34 |
| | | | | 293/133 |

(Continued)

FOREIGN PATENT DOCUMENTS

| CN | 106240505 A | 12/2016 | |
| DE | 102019104565 A1 * | 8/2020 | ............. B60R 19/18 |

(Continued)

*Primary Examiner* — Amy R Weisberg
*Assistant Examiner* — Sara Laghlam
(74) *Attorney, Agent, or Firm* — Bayramoglu Law Offices LLC

(57) ABSTRACT

A crash box system is provided. The crash box system includes V shaped leaf springs located between a front plate and a rear plate, wherein straight leaf springs have been placed vertically to the front plate and rear plate at wing winged corners. The crash box system further includes a cylindrical inner tube having a bevelled or outer tapered end surface being placed inside an outer tube having a rectangular cross-sectional structure with radiused outer corners and a reduced cross-sectional middle section. The V shaped leaf springs, the outer tube further having re-entrant hexagonal bottom imperfections and re-entrant hexagonal top imperfections, and the cylindrical inner tube having the bevelled or outer tapered end surface to provide the crash box system with energy absorption capabilities such that peak forces are kept low at different times. By this structural arrangement, the aim of the crash box system is to prevent injuries and traumas that occur due to accident effects such as a whiplash effect during accidents at different speeds.

5 Claims, 5 Drawing Sheets

(58) Field of Classification Search
USPC .............................................. 296/70, 197.03
See application file for complete search history.

(56) References Cited

U.S. PATENT DOCUMENTS

| | | | |
|---|---|---|---|
| 2009/0243312 A1* | 10/2009 | Handing | ................ B60R 19/26 |
| | | | 293/132 |
| 2010/0201139 A1* | 8/2010 | Hashimura | ............. B60R 19/18 |
| | | | 293/133 |
| 2017/0106822 A1 | 4/2017 | Steinebach et al. | |
| 2017/0136970 A1* | 5/2017 | Steinebach | ............. B60R 19/03 |
| 2018/0037179 A1 | 2/2018 | Steinebach et al. | |
| 2022/0212616 A1* | 7/2022 | Krasel | ..................... B60R 19/18 |
| 2022/0348261 A1* | 11/2022 | Nishimura | ............. B62D 25/08 |

FOREIGN PATENT DOCUMENTS

| | | | | |
|---|---|---|---|---|
| EP | 2937249 A1 | | 10/2015 | |
| KR | 20090070809 | * | 12/2007 | |
| KR | 20100060135 A | | 6/2010 | |
| KR | 20110032870 A | | 3/2011 | |
| KR | 20110051594 A | | 5/2011 | |
| WO | 2005120903 A1 | | 12/2005 | |
| WO | WO-2013114213 A2 | * | 8/2013 | ............ B21C 23/00 |
| WO | 2016007661 A1 | | 1/2016 | |
| WO | WO-2016007661 A1 | * | 1/2016 | ............ B22D 25/02 |
| WO | 2018119255 A1 | | 6/2018 | |
| WO | WO-2022211753 A1 | * | 10/2022 | |

\* cited by examiner

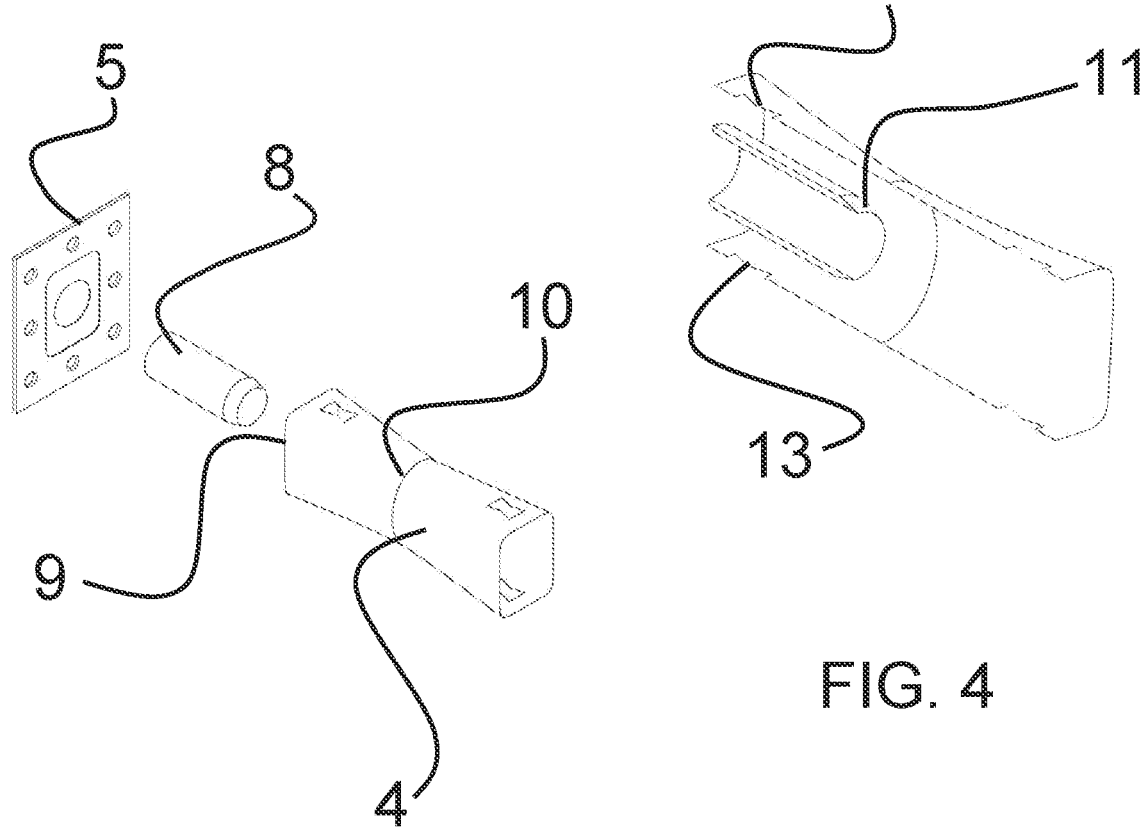

AUTOMOBILE CRASH BOX SYSTEM

CROSS REFERENCE TO THE RELATED APPLICATIONS

This application is the national stage entry of International Application No. PCT/TR2019/050790, filed on Sep. 25, 2019, which is based upon and claims priority to Turkish Patent Application No. 2018/15902, filed on Oct. 24, 2018, the entire contents of which are incorporated herein by reference.

TECHNICAL FIELD

The invention is related to a crash box system mounted to the bumper sections of vehicles that has been developed in order to absorb the force created during impact.

The invention is particularly related to a crash box system comprising a rear plate in addition to the crossbar (plate) located in the bumper section of the vehicle, and V shaped leaf springs positioned between them and structures where straight springs are vertical in relation to the wing inflections of the plates and telescopic unconventional tubular sections.

BACKGROUND

A conventional vehicle bumper comprises a strong steel crossbar that is fixed to simple structures such as square sectioned or sectional pyramid tubes that are generally fixed to the vehicle structure supporting means, wherein said bumper extends parallel to the front side of the vehicle under the elastic structure observed from the outside. The different shaped tubes which couple this steel crossbar structure to the supporting elements act as the crash absorbing energy and upon this several designs have been developed. In said designs the impact during a crash is initially received by the steel crossbar lying parallel to the vehicle and it submits the force created from the crash to the supporting structure of the vehicle. These tubes are elastically or plastically deformed and they absorb the energy of impact.

A crash box system is formed by mounting onto the front section of the vehicle via parallel steel crossbars, the crash tubes that generally have square sectioned and frusto-conical structures which are coupled to the double-S-guideway which is a part of the chassis of the vehicle.

In present systems the steel crossbar is a rigid structure and therefore it is not able to act as an adequate crash energy absorber. As crash tubes have sharp corners due to their square or rectangular shapes, they cause the formation of stress concentration at the sharp corners when stress is applied thereon. Under such stress, crash boxes (tubes) tear, and as a result of such tearing the crash tubes do not fold and deform which is an important part of crash energy absorption, therefore providing low crash energy absorption. Besides this, these designs have not been conducted according to accidents at different speeds; as a result sometimes said designs are not deformed during small accidents and sometimes they are completely deformed following a high speed accident where the force created from the crash is directly transferred to the passengers inside the cabin.

In the Korean patent document of the prior art numbered KR20100060135A in order to cope with a low speed collision, an integrated assembly of a connecting element such as a crash box and a rear beam is disclosed. In the related document a spring section and a spring connected to the rear beam is disclosed.

In the Korean Patent document numbered KR20110051594 of the prior art, a crash box is described. In the related document it is disclosed that the crash box is coupled to the bumper via a diaphragm spring and leaf spring.

In the United States Patent document numbered US2009243312A1 of the prior art a crash box that is formed of an inner and an outer circular tube is mentioned. (FIG. 1) In addition, the document shows a connecting element with a radius at the corners and a circular cavity in the middle. (FIG. 9)

In the United States Patent document numbered US2008030031A1 of the known state of the art a crash box that has been developed for vehicles is mentioned. In the related document it has been mentioned that a trigger was present in the vehicle box.

When the present systems in the art have been examined, since the existing solutions do not generally provide different reactions at different speeds, it can be seen that even at low speeds, due to the high power transmission to the occupants, said solutions may cause injuries and trauma following an accident effect such as the whiplash effect.

Therefore, it is required for a crash box system to be developed, comprising V shaped leaf springs between two plates, which can be beneficial not only for impacts that are head on but also for impacts received by the vehicle from different angles (at angles remaining between the front of the vehicle and the sides of the vehicle).

SUMMARY

The object of the present invention is to develop a crash box system comprising V shaped leaf springs between two plates, which includes flat sheets where these leaf springs are perpendicular to the folding points of the plates, and additionally comprises a telescopic outer tube section that does not have a conventional shape.

Another aim of the invention to provide a crash box system which shows different reactions against collisions at different speed, which can absorb impacts not only head on, but from the front-sides, or angularly, by means of the V shaped leaf springs located between two steel plates, wings and straight springs at the folding points of the wings.

BRIEF DESCRIPTION OF THE DRAWINGS

The system provided in order to reach the aims of the invention has been illustrated in the figures.

According to these figures;

FIG. 3: Is the exploded perspective view of the assembly of the crash boxes in a crash box system subject to the invention.

FIG. 4: Is the side section view of the assembly of the crash boxes in a crash box system subject to the invention.

Figure 1:
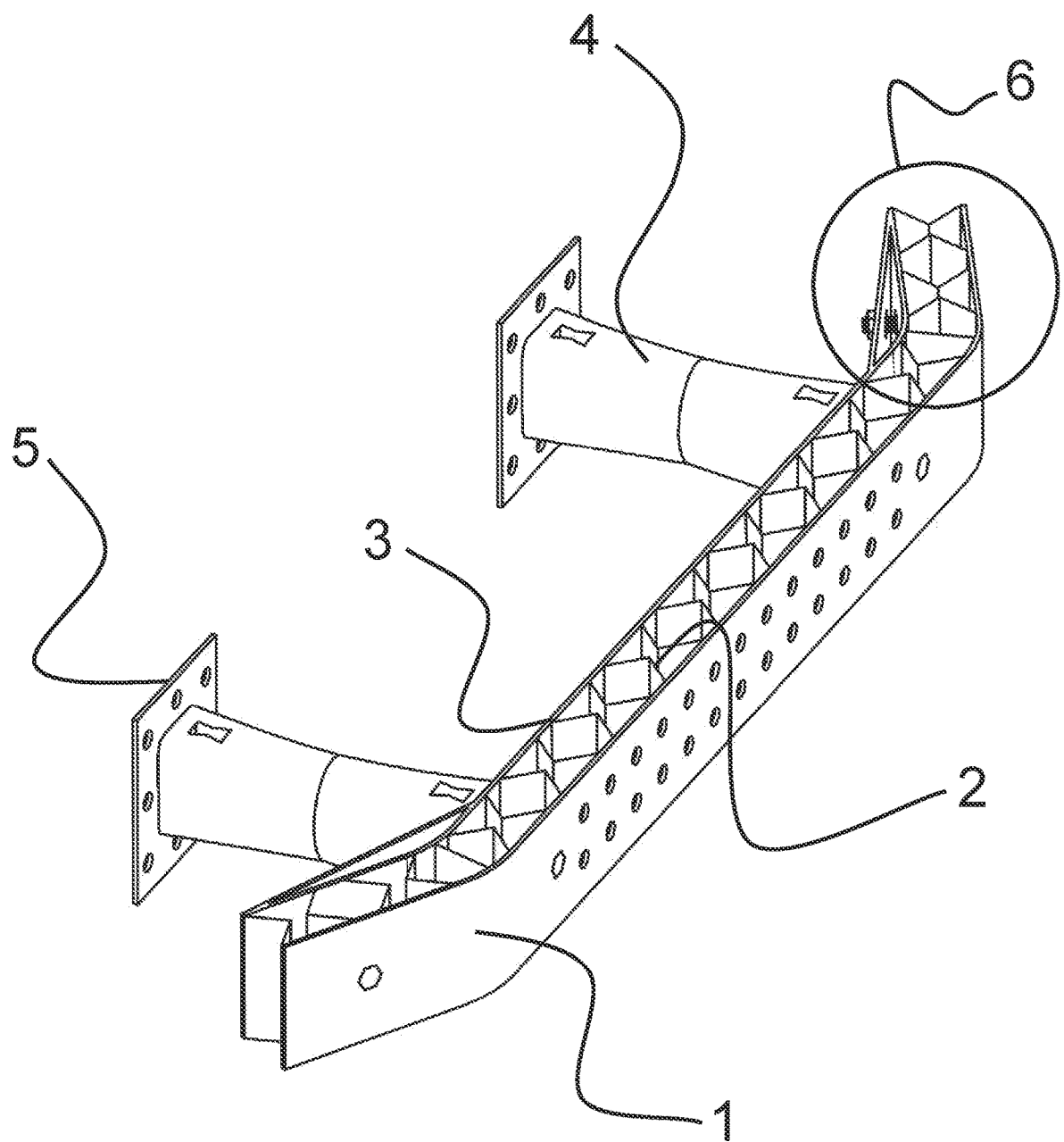
FIG. 1: Is the isometric drawing of the crash box system subject to the invention.
Figure 2:
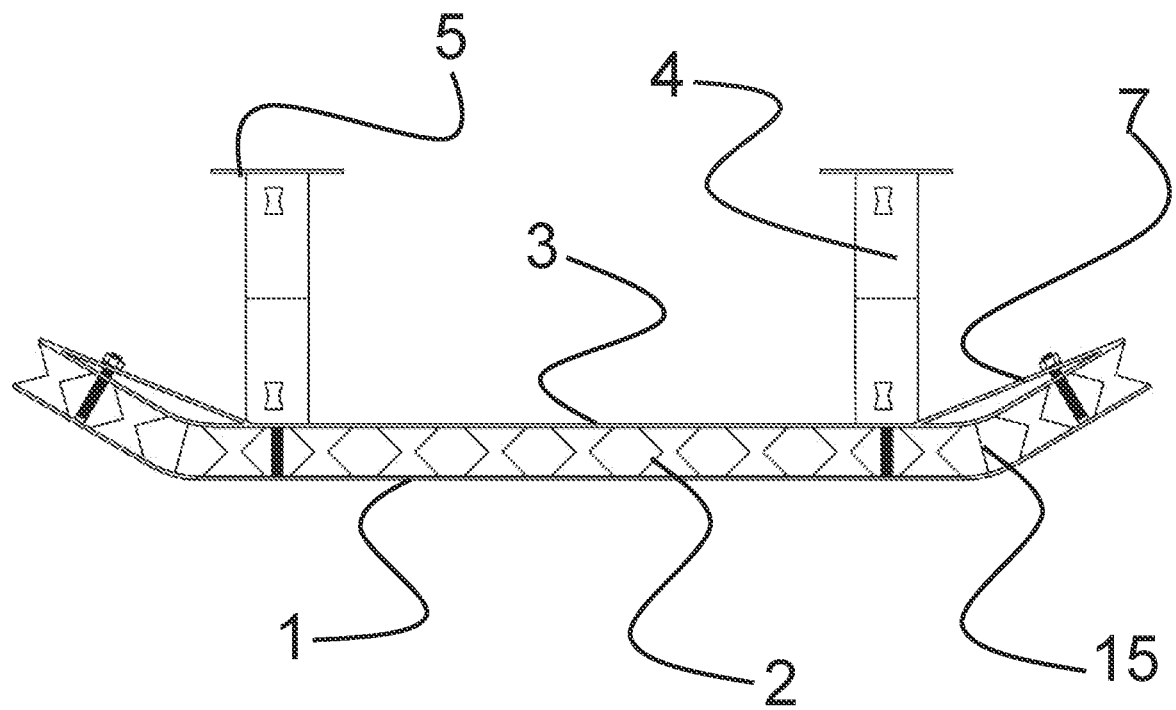
FIG. 2: Is the top view of the crash box system subject to the invention.
Figure 5:
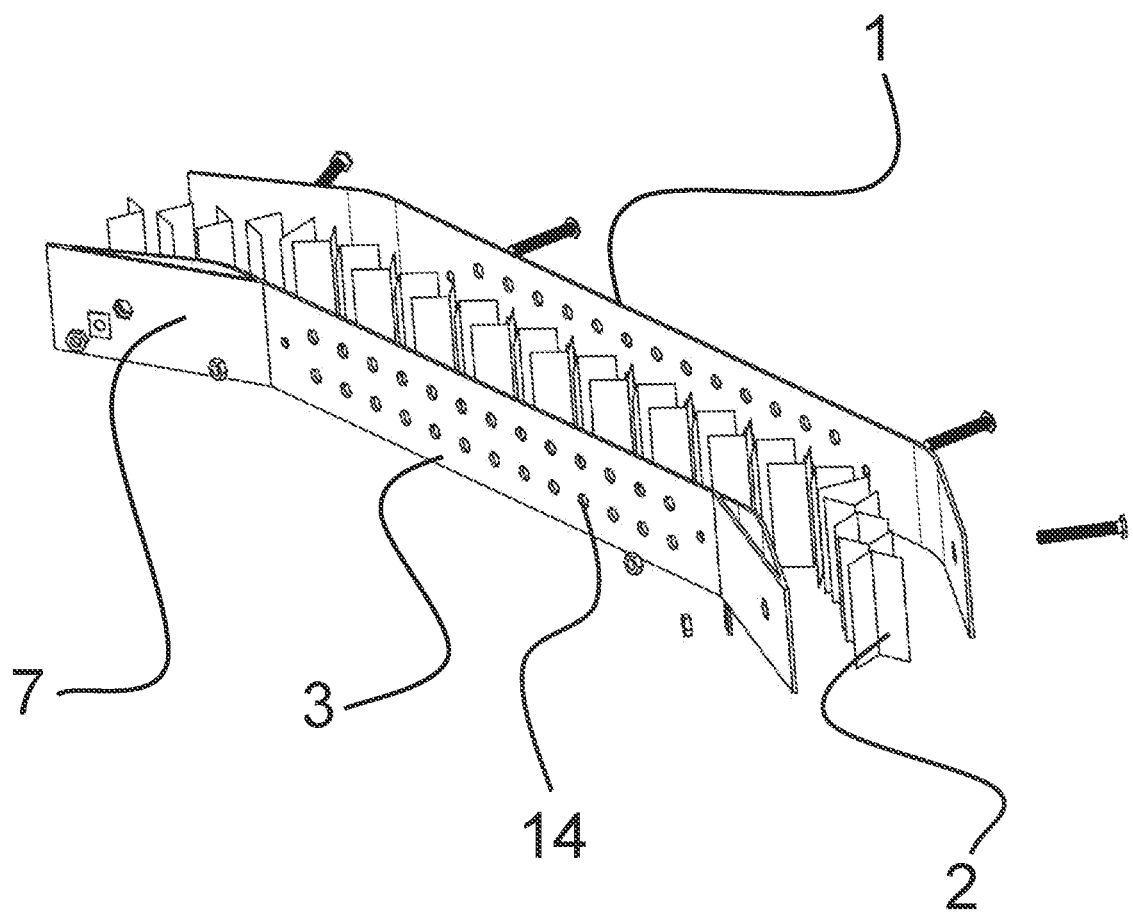
FIG. 5: Is the exploded perspective view of the plate assembly in a crash box system subject to the invention.
Figure 6:
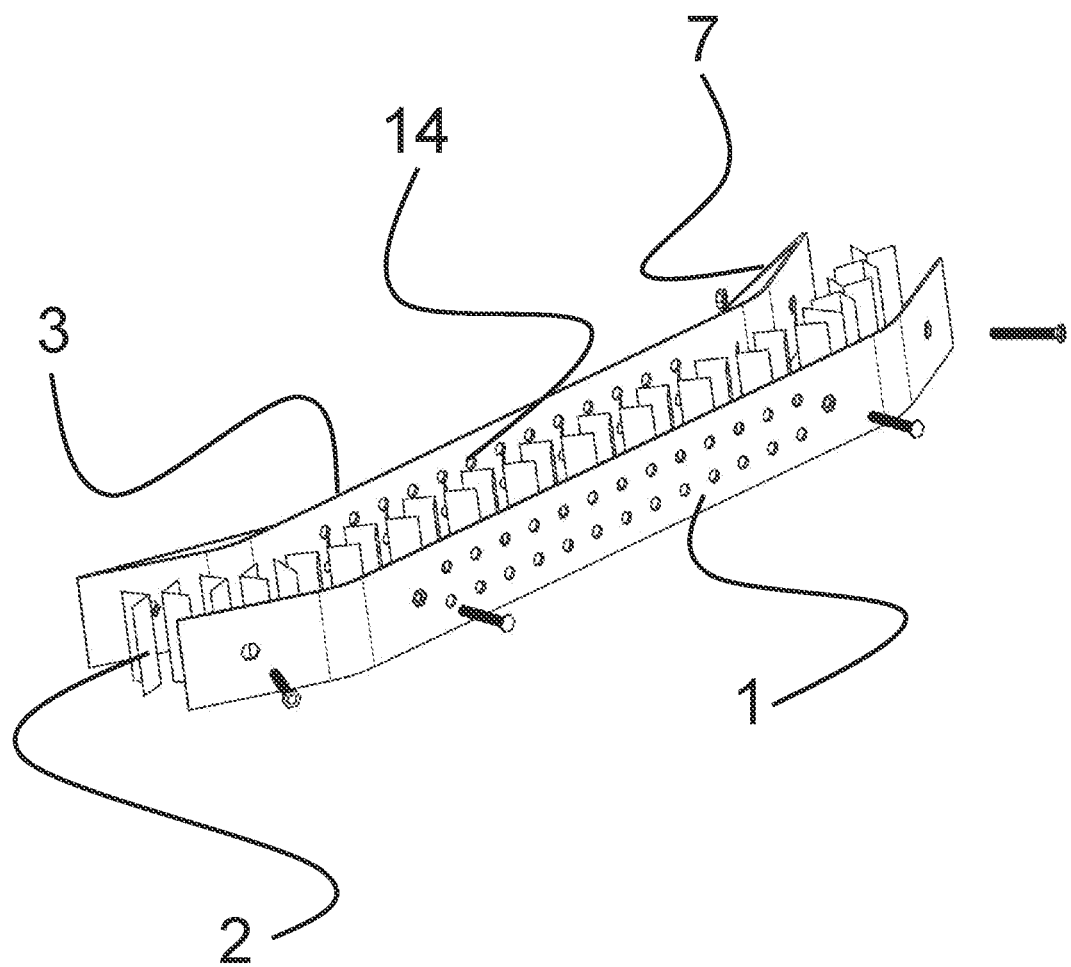
FIG. 6: Is the exploded perspective view of the plate assembly from a different angle, in a crash box system subject to the invention.

The parts in the figures have each been numbered and their references lave been listed below, 1. Front plate
2. Leaf springs 3. Rear plate
4. Outer crash box
5. Chassis coupling plate
6. Wing
7. Wing support plate
8. Inner crash box
9. Rectangular section of the outer tube having blended edge corners at the two ends
10. Circular cross section of the outer crash box
11. Bevelled or outer tapered end surface of inner crash box
12. Top re-entrant hexagon imperfection
13. Bottom re-entrant hexagon imperfection
14. Plate insertion holes
15. Straight spring

DETAILED DESCRIPTION OF THE EMBODIMENTS

The invention, is a crash box system, comprising,
A front plate (1) and a rear plate (3) placed in the bumper section of the vehicle,
Outer crash box (4) connected to the chassis connection plates (5) from one end and to the rear plate (3) from the other end.
Inner crash box (8) having a radial structure, located inside the outer crash box (4), and
characterized in that the said system comprising,
V shaped leaf springs placed between the front steel plate (1) and the rear steel plate (3).

In the system according to the invention, the structure forming the beam is the V shaped leaf springs placed between the front plate (1) and the rear plate (3), wherein said leaf springs (2) enable the absorption of the impact energy by elastically changing shape during low speed collisions following the deformation of the elastic components belonging to the bumper at the front of the energy absorption system. At the same time, air flow into the hood from the air passage holes (14) located on these plates has been provided.

The V shaped leaf springs (2) of the system subject to the invention have been placed between the front plate and rear plate. The placement of said V shaped leaf springs (2) is such that, one end of these springs is placed (welded, coupled by means of hinges) to the front plate (1) and the other end is placed into the channels opened on the rear steel plate (3)

In the system subject to the invention, two wings (6) and straight springs (15) at the folding points of the wings have been provided at the front section of the vehicle for angular collisions. The V shaped leaf springs (2) become straight at the folding points of these wings and during an accident; they provide additional energy absorption against head on collisions and angular impact by means of buckling deformation. These wings (6) are supported with extra wing support plates (7) and therefore during impact their flexibility does not increase a lot and as a result they enable the absorption of accident energy by the leaf springs (2). Following the complete deformation and depletion of the leaf springs (2), the outer crash boxes (4) step in.

Different from the conventional crash boxes, the outer crash boxes (4) comprise rectangular sections (9) with radius at the start and end sections thereof. The outer crash box (4) with the rectangular sections (9) having radius at the corner sections includes annular or elliptical transition cross sections (10) in the middle of the outer crash boxes. Therefore, sharp corners that may cause stress concentrations have not been used in boxes.

Outer crash boxes (4) having variable geometry have been used that are coupled from one end to the present chassis connection plates (5) and from the other end to the steel rear plate (3), in order to couple the system subject to the invention to the chassis of the vehicle.

At the starting rectangular sections, re-entrant hexagonal top and bottom imperfections (12, 13) have been formed on the box. Rectangular sections (9) have been used in order to simplify the mounting section. The re-entrant hexagonal top and bottom imperfections (12, 13) on the tubes, have been designed such that the tubes fold from both ends and absorb impact energy without increasing peak force, during collisions at higher speeds which enable the deformation of the leaf springs. The reason for the middle section of the tubes to be annular or elliptical transition cross sections (10) is that circular geometries are superior in absorbing impact energy in comparison to other geometries.

Even after the folding of the rectangular sections (9) at both ends due to the force created during an accident, the annular or elliptical transition cross sections (10) will also be deformed and shall absorb impact energy. Following the deformation and almost depletion of the outer box (4), in order to prevent the transmission of impact force completely into the cabin, an inner crash box (8) has been used. A bevelled or outer tapered end surface (11) of the inner crash box (8) ensures that the peak force is low and reduces whiplash effect.

By means of the rigid leaf springs (2) subject to the invention the vehicle will not be damaged at all or shall be damaged less than it normally would, due to the elastic deformation of said leaf springs (2) even at very low speed. Situations such as injuries, trauma and death shall be prevented by means of accident energy absorption even at high speeds, without tearing but folding of the outer crash boxes (4) of accident energy absorbing system. Following collisions with high energy that may completely deplete the outer crash boxes (4), the inner crash box (8) shall step in and shall absorb impact energy by means of plastic deformation. As the inner crash box (8) has the bevelled or outer tapered end surface (11), this shall also prevent high peak forces.

What is claimed is:
1. A crash box system, comprising:
a front plate and a rear plate provided on a front bumper section of a vehicle;
a pair of outer crash boxes respectively connected to a pair of chassis connection plates; each one of said pair of outer crash boxes having a first end respectively connected to said pair of chassis connection plates; each one of said pair of outer crash boxes having a second end respectively connected to said rear plate;
a pair of inner crash boxes respectively received within and radially spaced from each of said pair of outer crash boxes; each of said pair of inner crash boxes having a cylindrical structure with an outer tapered end surface about one end thereof;
wherein each of said pair of said inner crash boxes are respectively provided within each of said pair of outer crash boxes so that said outer tapered end surface extends toward said rear plate; each of said pair of outer crash boxes having a rectangular cross-sectional shape with radiused outer corners and a reduced cross-sectional middle section having an elliptical cross-sectional shape; said outer tapered end surface of each of said pair of inner crash boxes being positioned adjacent said reduced cross-sectional middle section of each of said pair of outer crash boxes; and a plurality of V shaped leaf springs separately provided between the front plate and the rear plate; said plurality of V shaped leaf springs separately secured between said front and said rear plates; wherein each one of said plurality of V shaped leaf springs having a first end secured to said front plate and a second end secured to said rear plate.

2. The crash box system according to claim 1, wherein the plurality of V shaped leaf springs are positioned vertically between the front plate and the rear plate.

3. The crash box system according to claim 2, comprising wings formed by folding of ends of the front plate and the rear plate.

4. The crash box system according to claim 3, comprising re-entrant hexagonal bottom imperfections and re-entrant hexagonal top imperfections provided on each of said pair of outer crash boxes.

5. The crash box system according to claim 4, wherein the wings comprise straight springs at folding points.

\* \* \* \* \*